(12) United States Patent
Guyer et al.

(10) Patent No.: US 7,505,689 B2
(45) Date of Patent: Mar. 17, 2009

(54) ELECTRONIC SIGNAL BLANKING IN OPTICAL TRANSCEIVERS

(75) Inventors: Robert C. Guyer, Beverly, MA (US); Tate J. Keegan, Goffstown, NH (US); Kevin A. LaRochelle, Goffstown, NH (US); Timothy J. O'Donnell, Bedford, NH (US); Joseph M. Schlupf, Newburyport, MA (US); Heather L. Keegan, Goffstown, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 543 days.

(21) Appl. No.: 11/044,821

(22) Filed: Jan. 27, 2005

(65) Prior Publication Data

US 2005/0175349 A1    Aug. 11, 2005

Related U.S. Application Data

(60) Provisional application No. 60/540,317, filed on Jan. 29, 2004.

(51) Int. Cl.
   *H04B 10/00* (2006.01)
(52) U.S. Cl. .................. 398/138; 398/41; 398/135; 398/136; 398/128
(58) Field of Classification Search ............ 398/41, 398/118–131, 135–138; 356/139, 139.04, 356/5.01, 5.04, 4.01; 342/26 D, 107, 59; 455/194.1; 244/3.16; 102/213
See application file for complete search history.

(56) References Cited

U.S. PATENT DOCUMENTS

| | | | | |
|---|---|---|---|---|
| 3,902,803 A | * | 9/1975 | Lego, Jr. | .............. 356/5.04 |
| 4,172,255 A | * | 10/1979 | Barrick et al. | .............. 342/26 D |
| 4,334,317 A | * | 6/1982 | Beesley | .............. 455/194.1 |
| 4,383,663 A | * | 5/1983 | Nichols | .............. 244/3.16 |
| 4,651,647 A | * | 3/1987 | Baker | .............. 102/213 |
| 5,050,986 A | | 9/1991 | Gatto et al. | |
| 5,465,142 A | * | 11/1995 | Krumes et al. | .............. 356/5.01 |
| 6,674,520 B1 | * | 1/2004 | Hicks et al. | .............. 356/139.04 |
| 6,674,720 B1 | | 1/2004 | Passint et al. | |
| 6,864,965 B2 | * | 3/2005 | DeFlumere | .............. 356/4.01 |
| 2002/0141696 A1 | | 10/2002 | Bruns | |
| 2004/0085891 A1 | | 5/2004 | Henriksson | |

* cited by examiner

*Primary Examiner*—Kenneth N Vanderpuye
*Assistant Examiner*—Li Liu
(74) *Attorney, Agent, or Firm*—Robert K. Tendler; Daniel J. Long

(57) ABSTRACT

A transceiver system allows for simultaneous operation of transmit and receive modes, even in shared path configurations, by temporarily making the receiver insensitive to transmitter energy and by modifying standard readout technology to rapidly dissipate any transmitter energy deposited onto the receiver's detector elements. The entirely electronic technique alerts the receiver to the imminent emission of each transmitter pulse. This alert opens a gate voltage switch in the readout and prevents energy that is present on the detector from being passed to the readout integrator. As soon as the transmitter pulse has passed and any charges it generated on the detector have been dissipated, the switch is automatically closed and the receiver is again fully active. Since this on/off switching happens automatically and rapidly it can operate independently from, and have very little impact on the receiver. Furthermore, it levies absolutely no limitations whatsoever on the operation of the transmitter.

16 Claims, 3 Drawing Sheets

ELECTRONIC SIGNAL BLANKING IN OPTICAL TRANSCEIVERS

RELATED APPLICATIONS

This Application claims rights under 35 USC § 119(e) from U.S. application Ser. No. 60/540,317 filed Jan. 29, 2004, the contents of which are incorporated herein by reference.

FIELD OF THE INVENTION

The present invention relates to optics and more particularly to optical transceiver systems.

BACKGROUND OF THE INVENTION

When transmitters radiate high intensity electromagnetic waves in close proximity to associated receivers with high sensitivities, these receivers can often be saturated, damaged or otherwise affected in a negative manner by the outgoing transmitter energy. This energy leaks, scatters or reflects back into the receiver.

In the electro-optical and infrared (EO/IR) regimes, this problem has conventionally been handled in one of several ways. Each of the following prior art methods may incur the operational penalties described below.

For split path architectures, the hardware for the transmit and receive functions, their optics and apertures, are physically separated. This approach necessarily takes up more physical space since the design must accommodate separate optical paths for the transmit and receive functions. Furthermore, it may imply harsh mechanical tolerances in order to guarantee that both paths continue to remain co-boresighted.

For baffles, barriers or blocks that prevent transmitter energy from scattering or reflecting back into the receiver field of view (FoV) are installed. This approach may alleviate some of the tolerances imparted on the split path design described above, but it also creates two separate, albeit coaxial, channels. This feature may also make auto-boresighting or operational alignment checks impossible. The inability to perform these functions may levy strict alignment and tolerance constraints of its own. Lastly, these baffles may physically occlude portions of the receiver aperture, and therefore lower overall sensitivity.

For spectral filtering, the transmitter wavelength is chosen to reside completely outside of the receiver spectral bandpass or within the blocking band of a notch filter that will sufficiently attenuate the transmitter intensity. This approach is unworkable, by definition, for active tracking systems because the recevier needs to be sensitive to transmitter radiation. It is the illumination of distant objects with transmitter light that the receiver needs to see in the first place.

In passive tracking systems, spectral filtering is possible, but no auto-boresighting or self-alignment checks can be performed. Again, the inability to perform these functions may levy strict alignment and tolerance constraints.

For shuttering, some mechanical means like an iris is employed to temporarily block the receiver FoV while the transmitter emits each pulse. The utility of this approach may be limited by the speed of the physical mechanism as well as its reliability. Mechanical shuttering may be roughly a thousand to a million times slower than the electronic techniques described herein. This speed may be acceptable in some applications but is unacceptable for others.

Finally, for frame dumping, nothing is done to prevent the blinding saturation effects. Instead, receiver frames that have been corrupted by the presence of unwanted transmitter energy are merely ignored. This approach may be used in systems that range gate or in systems that transmit once and then receive many frames. Tracking systems, however, generally require the continual update coordinates derived from receiver frames and therefore do not have the luxury of throwing away data frames.

A method of electronic signal blanking in optical transceivers that overcomes the disadvantages of the prior art is therefore needed.

SUMMARY OF THE INVENTION

A tracker blanking system is provided by which the receiver can eliminate these negative effects while incurring negligible operational penalties. Tracker blanking is an electrical technique that makes use of available signals and existing readout technology. Additionally, the subject system modifies the design of standard readout chip technology to provide for the enhancement and optimization of the system.

More particularly, the subject system employs an electronic technique that allows simultaneous operation of the transmit and receive functions, while overcoming their mutual interference problems and incurring minimal operational penalties. A second part of the subject system optimization tailors the existing readout electronics to further reduce operational penalties from minimal to negligible.

In one embodiment, the method for blanking is accomplished by electronically alerting the receiver to the imminent emission of a transmitter pulse. This alert opens a gate voltage switch in the readout and prevents energy that is present on the detector from being passed to the readout integrator. As soon as the transmitter pulse has passed, and any charges it generated on the detector have been dissipated, the switch is automatically closed. The receiver is again fully active. Since this on/off switching happens automatically and rapidly compared to the detector integration time, it can operate independently from, and have very little impact on the receiver. Furthermore it levies absolutely no limitations whatsoever on the operation of the transmitter.

The subject system for optimized blanking improves this process by actively discharging the detector while the gate switch is open. By doing so, any charges created and stranded on the detector pixel by the transmitter pulse can be rapidly dissipated. This feature allows the gate switch to be closed almost immediately, thereby reducing the blanking dead time to nearly its absolute limit: the transmitter pulse length. Again, since this time is several orders of magnitude smaller than the typical integration time of the receiver, the overall duty cycle is miniscule and results in negligible loss of sensitivity.

By way of further background, the subject system will here be discussed in relation to related solutions described in U.S. patents and pending patent applications. These will include U.S. Pat. No. 5,050,986 issued to Gatto et al., U.S. Pat. No. 6,674,520 to Hicks et al., U.S. Patent Application 2004/0085891 to Henriksson, and U.S. Patent Application 2002/0141696 to Bruns.

In U.S. Pat. No. 5,050,986, Gatto et al. are trying to overcome a problem nearly identical to the one solved by the subject invention, namely an optical transceiver whose detector must be insensitive to scatter from outgoing transmitter pulses that use the same optics. Furthermore, since their application is an active laser rangefinder, Gatto et al. are also required to utilize a transmitter within the spectral band of their receiver. Beyond these two points, however, the two applications begin to diverge. The unique set of constraints and possibilities in each application eventually leads to solutions with little in common.

Gatto et al. find range simply by measuring the time delay between the outgoing transmitter pulse and the return of this pulse's echo or 'ping' back from the target of interest. Such a measurement does not require accurate amplitude measurements by the receiver, only the exceedence of some threshold that constitutes a valid return.

The subject invention, by contrast, is a passive system that looks only for the energy emitted by other targets and not the transmitter. In fact, the subject system does not want to see the transmitter at all. Furthermore, the subject system is not timing echo delays and is instead measuring the amplitude of the signals from such targets. The specifics of the subject receiver configuration and the characteristics of its use are therefore markedly different than those in the Gatto et al. application.

A second key difference between the applications has to do with their concepts of operations and the associated impacts on system hardware. Since the subject system is looking for other targets, as opposed to its own transmitter reflections, the subject detector is essentially always on. Its multi-element staring focal plane array continually measures spatial imagery and uses an integrated readout chip to periodically provide image data from all the pixels to the system. What is therefore necessary is to interrupt the receiver periodically and briefly with a blanking signal while it operates.

In contrast, the receiver used by Gatto et al. detector is primarily off until it sees the scatter of an outgoing pulse. This starts their timing clock and turns the detector on. Instead of using timing signals for brief interrupts as the subject system does, Gatto et al. use the signal to toggle back and forth between transmit and receive modes.

It is precisely this functional scheduling, as well as the use of discrete APD detectors and electronics that enable Gatto et al. to incorporate the delay lines, electronic latch and T/R (transmit/receive) switch that comprise their solution. It is an elegant and automatic solution to be sure, but one that is fundamentally incompatible with the subject application and system.

In U.S. Pat. No. 6,674,520, Hicks et al. solve an identical problem with a different technique. The major differences are first that their system is synchronous, whereas the subject system is asynchronous. Like the subject system, they have a timing signal that corresponds to when the transmitter is firing. Hicks et al. refer to their signal as blanking, whereas it is perhaps more accurately described as a hold-off mechanism. They provide this signal to their receiver as a means to inhibit or delay the start of integration. In other words, receiver timing is slaved to transmitter timing.

The subject system, by contrast, provides this timing signal to the receiver with a fundamentally different intent. It is not used to gate or clock the receiver operation, but rather, to temporarily desensitize or disable it during operation.

The above description is slightly imprecise and its fuller explanation reveals the second fundamental difference between the systems. The timing signal Hicks et al. employ is created at a system or high level of control. A processor creates the signal that is used to both clock the emission schedule of their transmitter and provide instructions that determine the operational mode of the receiver. In this way, the two mutually exclusively tasks are coordinated so as not to interfere.

In the subject invention, by contrast, blanking protection is implemented at the component level. There is no system level oversight or regulation imposed because it is not needed. The transmitter operates however and whenever it wants, subject to other unrelated system constraints. It emits an electronic timing or synchronization pulse (SYNC PULSE) slightly before each transmitter pulse. This signal does not go to the system or detector processor to provide instructions. Rather, it goes directly to the electronic readout chip on the detector assembly. The subject detector is therefore also able to operate however and whenever it wants without regard for, and quite oblivious to, the presence of the transmitter. The blanking signal going into the dewar takes advantage of some device physics to automatically blank the transmitter pulses. Because the effect is so rapid, the overall consequence or impact to the detector is miniscule.

In his patent application 2004/0085891, Henriksson deals with a similar problem to that solved by the subject invention. He is trying to remove noise from his detected signals. Similarly, the subject system is trying to prevent blinding saturation, which itself can be viewed as an overwhelming noise source, from interfering with its receiver.

Beyond this top-level similarity, there are major differences between the applications. Henriksson is working in multi-channel communications with transmitters and receivers that are not necessarily synchronized, and may not even be co-located, but are at least cooperating in their task. The subject optical transceiver application has to do with two components of the same system that are competing for a shared resource, i.e. the system aperture.

As to the objectives of the two systems, Henriksson's objective is a method that removes noise from signals once it has been sensed by the detector. The objective of the subject system is to prevent the detector from sensing the unwanted noise, by making it electrically inert or unresponsive at specific times. If one were to allow the subject detector to sense the noise as Henriksson does, it would already be too late to prevent saturation because the noise in the subject system comes in the form of overwhelming saturation.

In the subject system, the solution is implemented strictly as a hardware change. A single electrical signal automatically renders the subject detector unresponsive just before saturating laser backscatter arrives. By contrast, Henriksson allows the noise to be sensed because he has no a priori knowledge of its arrival. He requires a solution that notices the arrival of noise and then employs a variety of post-processing techniques, including software algorithms, to recover the desired signal from noisy input. Such processing may be performed in real time, but the term post-processing is used here to emphasize the fact that all of this takes place after the detection event.

Finally, patent application 2002/0141696 to Bruns relates to a completely different application having to do with the alignment of fiber optics and not to receiver saturation during operation. It uses similar terminology in several places, but the contexts are entirely different.

In summary, a transceiver system allows for simultaneous operation of transmit and receive modes, even in shared path configurations, by temporarily making the receiver insensitive to transmitter energy and by modifying standard readout technology to rapidly dissipate any transmitter energy deposited onto the receiver's detector elements. The entirely electronic technique alerts the receiver to the imminent emission of each transmitter pulse. This alert opens a gate voltage switch in the readout and prevents energy that is present on the detector from being passed to the readout integrator. As soon as the transmitter pulse has passed and any charges it generated on the detector have been dissipated, the switch is automatically closed and the receiver is again fully active. Since this on/off switching happens automatically and rapidly it can operate independently from, and have very little impact on the receiver. Furthermore, it levies absolutely no limitations whatsoever on the operation of the transmitter.

BRIEF DESCRIPTION OF THE DRAWINGS

These and other objects of the subject invention will be better understood in conjunction with the Detailed Description in conjunction with the Drawings, of which

DETAILED DESCRIPTION

Consider a transceiver that sends energy pulses out of an aperture and receives energy in through that same aperture. The two optical paths can be combined with either a beamsplitter or a fold-in optic as illustrated in FIGS. 1A and 1B.

Figure 1A:
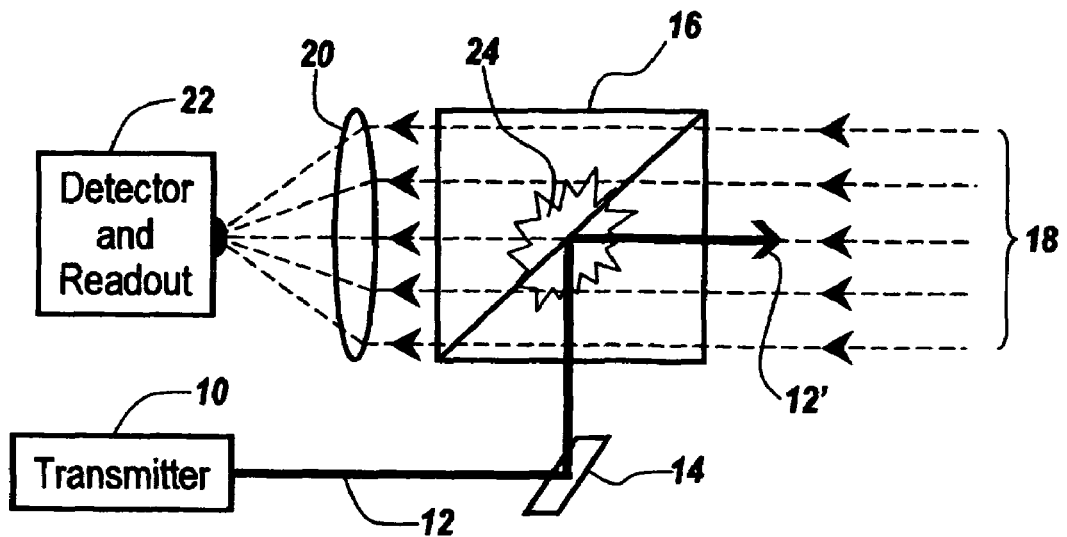
FIGS. 1A and 1B are schematic drawings showing preferred embodiments of optical transceivers amenable to the present invention.

Referring now to FIG. 1A, a transmitter 10 emits a beam 12 that is redirected by a fold mirror 14 so that in impinges upon a beamsplitter 16. There beam 12 is directed out as illustrated at 12'. Radiation 18 from the field of view or scene is directed through beamsplitter 16 and through focusing optics 20 onto a detector and readout array 22.

Here it can be seen that there is significant transmitter scatter 24 off the optics which can cause saturation of the receiver portion of the optical transceiver. It is this saturation which causes problems in optical transceivers and for which the subject invention is adapted. Note well that the problematic scatter is not created solely at the beamsplitter surface 16 as illustrated. It occurs at every subsequent system optic not illustrated here for the sake of simplicity. It can also occur at external objects in close proximity to the subject system, be they large macro-surfaces or aerosols and particulates.

Figure 1B:
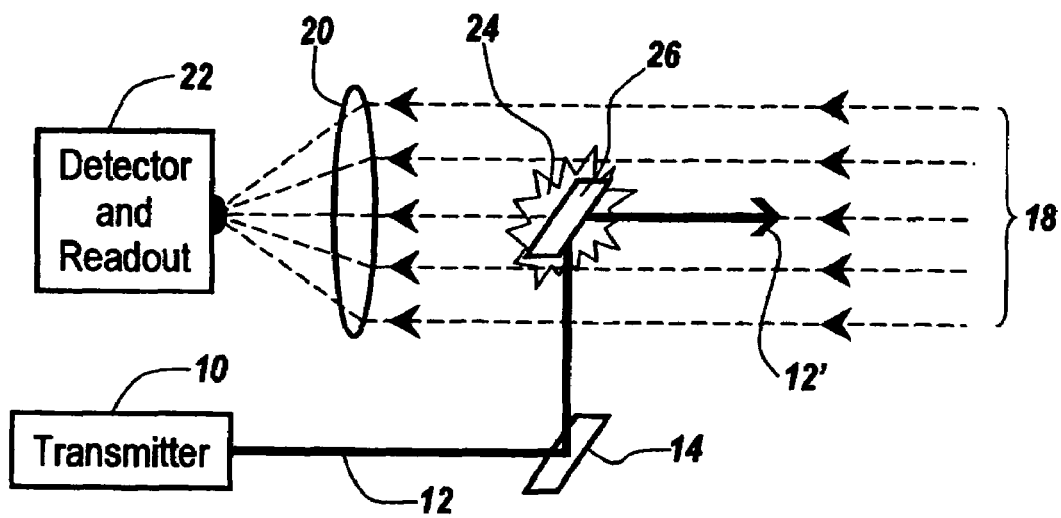

FIG. 1B illustrates the use of a fold mirror 26 used instead of beamsplitter 16, with the fold mirror centered in the along the receiver optical axis.

Ideally, the transmitter would be free to emit pulses whenever needed, in any required format. Similarly, the recevier is 'staring' out into space at all times. The term 'staring' here only implies that it is capable of providing data frames perpetually, without any synchronization to the transmitter or the outside world. Physically, this could be implemented with a scanning optical system.

Under these circumstances, the receiver will be blinded if it happens to be looking while a transmitter pulse is emitted. The solution is to either prevent the transmitter from firing while the receiver is looking, or conversely, to prevent the receiver from being affected by outgoing transmitter energy. In many applications the former approach is completely unworkable. The transmitter must be allowed to operate unencumbered by scheduling concerns.

Figure 2:
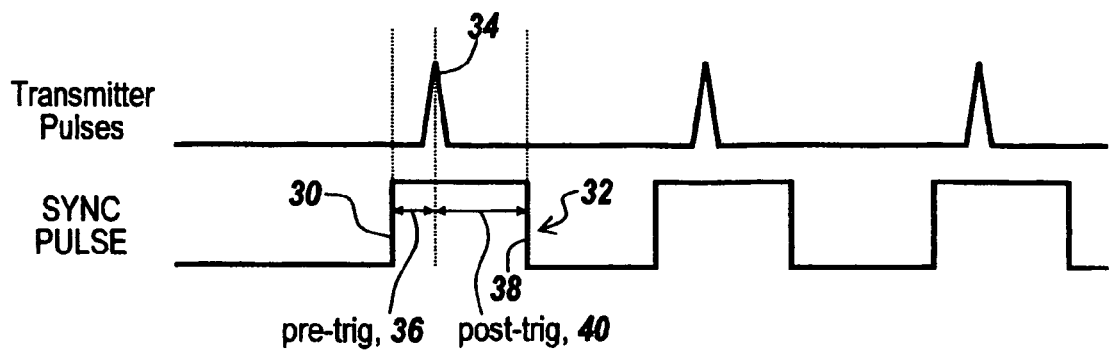
FIG. 2 is a schematic drawing showing PreTrigger and PostTrigger intervals of a transmitter sync pulse used to enable tracker blanking.

The most desirable technique, therefore, is a method that prevents the outgoing transmitter pulses from blinding the receiver. The transmitter is allowed to operate as needed, emitting energy pulses whenever necessary for proper operation of the system. While doing so, it also provides an electrical sync pulse slightly before the energy is emitted (hereafter referred to as PreTrigger), and stays high for a finite time after the pulse has been emitted (hereafter referred to as PostTrigger). This is illustrated in FIG. 2 in which the leading edge 30 of pulse 32 leads the transmitter trigger pulse 34 by a PreTrigger amount designated by double-ended arrow 36. The trailing edge 38 of pulse 32 defines the PostTrigger interval whose length is indicated by double-ended arrow 40. The actual length of the PreTrigger 36 and PostTrigger 40 segments are determined by the transmitter pulsewidth as well as the detector response, dissipation and recovery times in each specific application.

Figure 3:
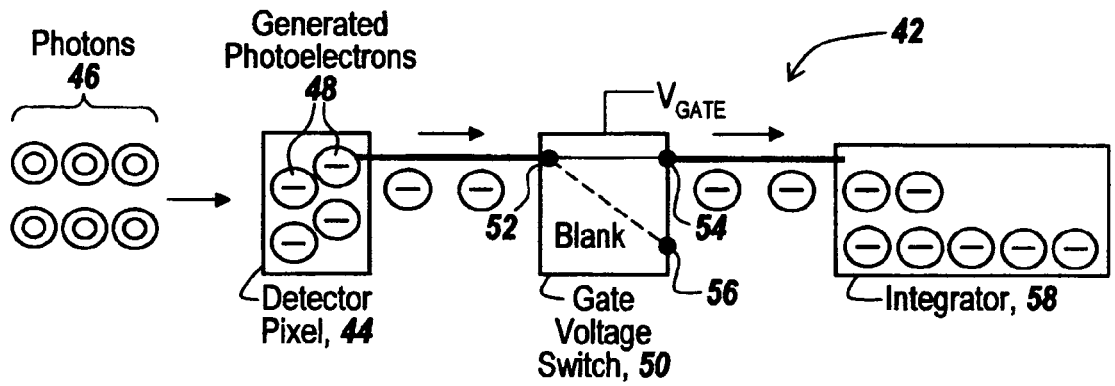
FIG. 3 is a schematic drawing showing a detector and readout chain.

On the other side of the system, and as illustrated in FIG. 3, the reciever 42 has an array of detector pixels 44 in which received photons 46 are detected and converted into photoelectrons, as illustrated at 48. These electrons migrate to a gate 50 that either allows the collected charge 48 to be accumulated in the integrator 58 via terminal 54, or inhibits this transition by switching to a no contact terminal 56.

Under normal operation, no gate voltage (Vgate) is applied to switch 50, and charge freely migrates from pixel 44 to integrator 58. Integrator 58 forms a storage bin or well where the charges are accumulated until the information is read out. This period of accumulation is referred to as a frame and its duration is the integration time.

Upon application of Vgate, the normal connection from terminal 52 to terminal 54 is interrupted. Since there is no transfer path for the photoelectrons 48, they must reside on the detector pixel 44 itself. The pixel 44 has a miniscule capacity for charge and therefore becomes inert almost immediately. Once the pixel 44 is saturated no other photons 46 can be converted, regardless of how many impinge upon the surface. Once the transmitter pulse has passed, the few electrons 48 present can be drained, delayed until they dissapear, or just ignored as the application requires. More details on these options follows in the description below.

The crucial realization behind the subject blanking system is the idea of rapidly switching the gate voltage 50 in synch with transmitter emissions. Temporarily opening the gate at these times prevents the collection of charges generated by the undesirable transmitter energy. Since these charges are not collected, they do not fill the well and therefore do not saturate the receiver.

Figure 4:
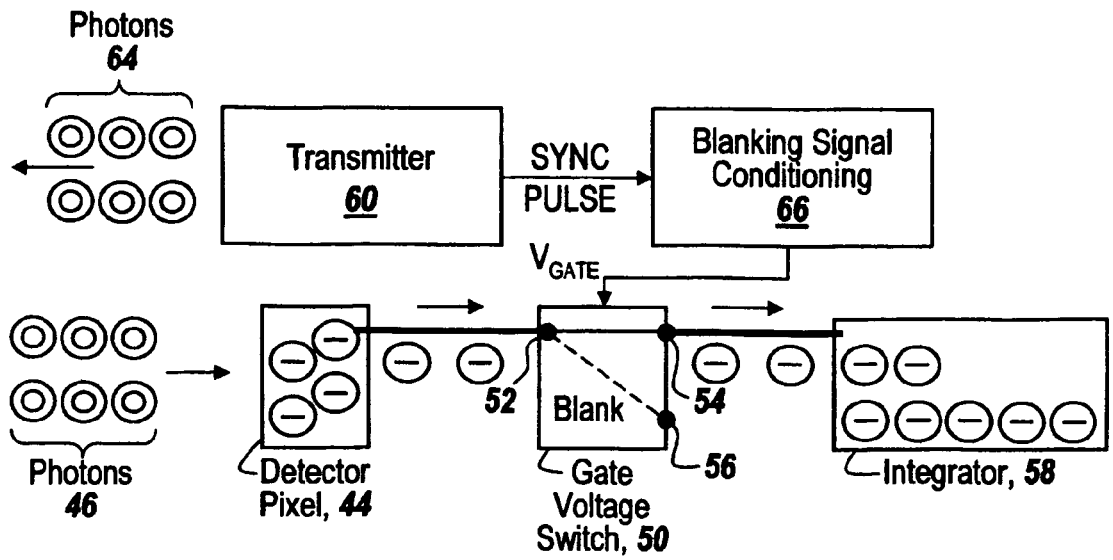
FIG. 4 is a schematic drawing showing a detector readout chain modified to accept the sync pulse input.

The key to implementing the subject invention is illustrated symbolically in FIG. 4. Here, transmitter 60 emits a sync pulse 62 just prior to emitting photons 64. The sync pulse is coupled to a blanking signal conditioning circuit 66 that generates the Vgate signal that is coupled to switch 50.

Figure 5:
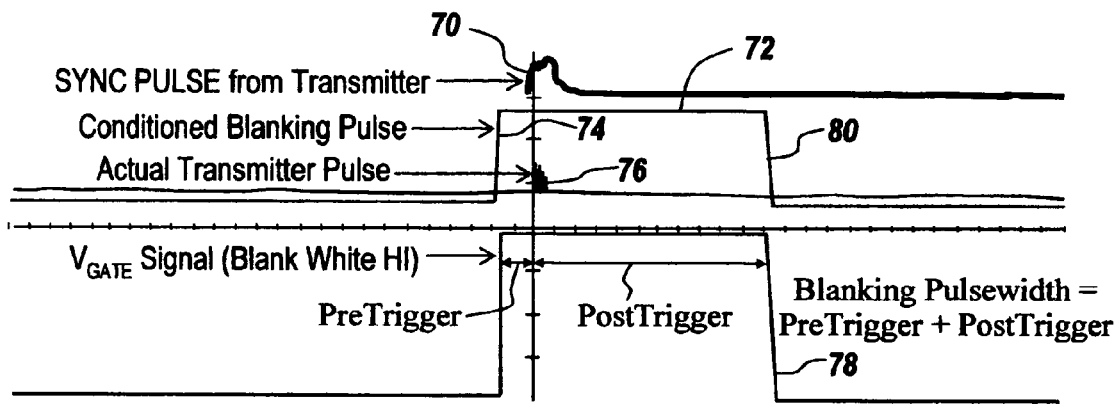
FIG. 5 is a schematic drawing showing a trace of the transmitter, blanking and receiver gate signals.

The signal trace in FIG. 5 illustrates how the timing of the circuit operates. Whenever a transmitter pulse is going to be sent, it is preceeded slightly by a rising sync pulse 70 edge. This is conditioned and results in a conditioned blanking pulse 72 having a leading edge 74 which leads the actual transmitter pulse 76. The conditioned blanking pulse 72 leads to the Vgate signal 78 that opens the gate switch briefly and isolates the detector element from its charge well. Any photoelectrons created by the outgoing transmitter pulse are prevented from reaching the well and are eventually lost due to recombination physics in the detector itself. Once the transmitter pulse has passed, the falling blanking pulse edge closes the gate voltage switch and re-establishes the path between the detector and the readout.

If the receiver can accomplish this 'blinking' quickly enough, it loses only a small fraction of its overall integration time in each frame. This can either be accepted as a slight loss of sensitivity, or the integration time can be lengthened appropriately to account for these dropout slivers.

During testing with one hardware configuration, the required PreTrigger time was found to be approximately one microsecond. If the delay was shorter than this, the detector was not fully OFF by the time the pulse arrived, and there was some leakage. This delay could be further truncated with some improvements relating to component speed, but this is not critical for most applications. One microsecond of overhead is negligible in most cases.

Shortening the PostTrigger delay is the key to making the subject system useful in more applications. The minimization of this delay is limited by the rate at which photoelectrons can be removed from the detector cell. If the gate were closed prior to such removal, any remaining charge carriers would simply continue on to the integrator. Blanking would have had virually no effect, save for a slight delay induced in the transit time of these charges.

Figure 6:
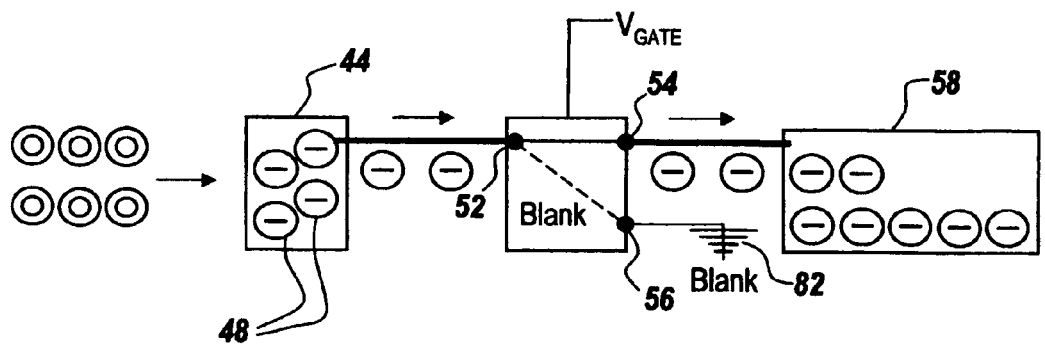
FIG. 6 is a schematic drawing showing a preferred embodiment of the new readout innovation that enhances and optimizes the tracker blanking innovation.

As shown in the FIG. 4 embodiment, when the gate voltage switch is openned, any charge created on the detector loiters there until it gradually, exponentially, decays away. Only then can the gate be reclosed and normal operation resumed. The embodiment depicted in FIG. 6 actively hastens the removal of residual detector charge instead of just waiting for it to disappear. If the other terminal 56 of switch 50 is gounded or reverse biased as illustrated at 82, this slight change in readout circuitry accelerates the unwanted charge 48 off of the detector element 44. The switch 50 can then be reclosed almost immediately, again on the order of 1 microsecond.

It will be appreciated that the subject invention has the following advantages.

The subject system is completely electronic. There are no moving parts. The latencies and switching speeds are due to RC time constants (nanseconds to microseconds) instead of mechanical actuators or solenoids (milliseconds).

Moreover, the subject system eliminates the need for all baffles and beamstops. Actual numbers will vary with specific implementations, but this can approximately double the collecting aperture for the receiver.

Further, the subject system allows for toggling on and off dynamically. This advantage means the blanking function can be disengaged so as to allow the receiver to see the transmitter for calibration or auto-boresighting. When normal staring operation resumes, blanking can then be engaged and the receiver will again be blind to scatter as necessary.

Thus the subject system for the first time allows for a truly shared or common path transceiver architecture. This advantage halves the number of required apertures and reduces the overall system volume. Most importantly, it eliminates the need to achieve and maintain receiver/transmitter co-boresight. Since both paths make use of common optics, any motion, whether it be slow drift or fast vibration, carries the two paths together.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. In a co-boresighted optical transceiver having a pulsed transmitter and a receiver utilizing the same aperture as said transmitter and having a detector coupled to an integrator having a normal integrating period for accumulating the detected energy, a system for permitting the simultaneous operation of said transmitter and receiver, comprising, a synchronization pulse for activating said transmitter to create a pulse of energy such that a transmitter pulse is produced a short time after the generation of said synchronization pulse; and a voltage controlled switch between said detector and said integrator coupled to said synchronization pulse, and without a system-level oversight processor, for interrupting the connection between said detector and said integrator upon generation of said synchronization pulse and for reestablishing said connection so as to establish a receiver blanking interval shorter than the normal integrating period for said receiver, whereby saturation of said receiver by said transmitter pulse is automatically avoided with the generation of said transmitter pulse, and whereby the receiver function is automatically reestablished so as not to materially affect receiver sensitivity;

wherein the time interval between the production of said transmitter pulse and the leading edge of said sync pulse is on the order of one microsecond, thus to establish a one microsecond PreTrigger time interval.

2. The system of claim 1, wherein the time that said switch operates to interrupt said connection is much less than said normal integration period.

3. The system of claim 1, wherein the length of time that said switch operates to interrupt said connection is on the order of the transmitter pulse length.

4. The system of claim 1, and further including a detector discharging circuit coupled to said detector when said switch is interrupting said connection to dissipate any charges on said detector, whereby said blanking interval is minimized.

5. The system of claim 4, wherein said detector discharging circuit includes a ground coupled to said detector.

6. The system of claim 4, wherein said detector discharging circuit includes a reverse biasing circuit.

7. The system of claim 1, wherein the time interval between the generation of said transmitter pulse and the time that said connection is reestablished depends upon the rate at which photoelectrons can be removed from said detector.

8. The system of claim 7, wherein the time interval between the generation of said transmitter pulse and the time that said connection is reestablished is on the order of one microsecond, thereby to establish a one microsecond PostTrigger time interval.

9. In a co-boresighted optical transceiver having a pulsed transmitter and a receiver utilizing the same aperture as said transmitter and having a detector coupled to an integrator having a normal integrating period for accumulating the detected energy, a system for permitting the simultaneous operation of said transmitter and receiver, comprising, a synchronization pulse for activating said transmitter to create a pulse of energy such that a transmitter pulse is produced a short time after the generation of said synchronization pulse;

a voltage controlled switch between said detector and said integrator coupled to said synchronization pulse, and without a system-level oversight processor, for interrupting the connection between said detector and said integrator upon generation of said synchronization pulse and for reestablishing said connection so as to establish a receiver blanking interval shorter than the normal integrating period for said receiver, whereby saturation of said receiver by said transmitter pulse is automatically avoided with the generation of said transmitter pulse, and whereby the receiver function is automatically reestablished so as not to materially affect receiver sensitivity, and a detector discharging circuit coupled to said detector when said switch is interrupting said connection to rapidly dissipate any charges on said detector, whereby said blanking interval is minimized;

wherein the time interval between the production of said transmitter pulse and the leading edge of said sync pulse is on the order of one microsecond, thus to establish a one microsecond PreTrigger time interval.

10. The system of claim 9, wherein the time that said switch operates to interrupt said connection is less than said normal integration period.

11. The system of claim 9, wherein the length of time that said switch operates to interrupt said connection is on the order of the transmitter pulse length.

12. The system of claim 9, wherein said detector discharging circuit includes a ground coupled to said detector.

13. The system of claim 9, wherein said detector discharging circuit includes a reverse biasing circuit.

14. The system of claim 9, wherein the time interval between the generation of said transmitter pulse and the time that said connection is reestablished depends upon the rate at which photoelectrons can be removed from said detector.

15. The system of claim 14, wherein the time interval between the generation of said transmitter pulse and the time that said connection is reestablished is on the order of one microsecond, thereby to establish a one microsecond Post-Trigger time interval.

16. In a co-boresighted optical transceiver having a pulsed transmitter and a receiver utilizing the same aperture as said transmitter and having a detector coupled to an integrator having a normal integrating period for accumulating the detected energy, a system for permitting the simultaneous operation of said transmitter and receiver, comprising, a synchronization pulse for activating said transmitter to create a pulse of energy such that a transmitter pulse is produced a short time after the generation of said synchronization pulse;

a voltage controlled switch between said detector and said integrator coupled to said synchronization pulse, and without a system-level oversight processor, for interrupting the connection between said detector and said integrator upon generation of said synchronization pulse and for reestablishing said connection so as to establish a receiver blanking interval shorter than the normal integrating period for said receiver, whereby saturation of said receiver by said transmitter pulse is automatically avoided with the generation of said transmitter pulse, and whereby the receiver function is automatically reestablished so as not to materially affect receiver sensitivity; and a detector discharging circuit coupled to said detector when said switch is interrupting said connection to dissipate any charges on said detector, whereby said blanking interval is minimized, wherein the time that said switch operates to interrupt said connection is less than said normal integration period, the length of time that said switch operates to interrupt said connection is on the order of the transmitter pulse length, the detector discharging circuit includes a ground coupled to said detector, and the detector discharging circuit includes a reverse biasing circuit;

wherein the time interval between the production of said transmitter pulse and the leading edge of said synch pulse is on the order of one microsecond, thus to establish a one microsecond PreTrigger time interval.

* * * * *